(12) United States Patent  
Tomaru

(10) Patent No.: US 8,121,489 B2  
(45) Date of Patent: Feb. 21, 2012

(54) OPTICAL TRANSMITTING AND RECEIVING SYSTEM

(75) Inventor: Tatsuya Tomaru, Hatoyama (JP)

(73) Assignee: Hitachi, Ltd., Tokyo (JP)

( * ) Notice: Subject to any disclaimer, the term of this patent is extended or adjusted under 35 U.S.C. 154(b) by 932 days.

(21) Appl. No.: 12/128,863

(22) Filed: May 29, 2008

(65) Prior Publication Data

US 2009/0052905 A1    Feb. 26, 2009

(30) Foreign Application Priority Data

Jun. 15, 2007  (JP) ................................ 2007-158949

(51) Int. Cl.  
    *H04B 10/12* (2006.01)
(52) U.S. Cl. ......................... 398/141; 398/161; 398/188
(58) Field of Classification Search .......... 398/140–141, 398/161–162, 188–190  
See application file for complete search history.

(56) References Cited

U.S. PATENT DOCUMENTS

| | | | | |
|---|---|---|---|---|
| 6,466,706 B1* | 10/2002 | Go et al. | ......................... | 385/12 |
| 2005/0128482 A1* | 6/2005 | Gibbs | ........................... | 356/364 |
| 2005/0185968 A1* | 8/2005 | Dorrer et al. | .................. | 398/188 |
| 2006/0146337 A1* | 7/2006 | Hartog | ........................... | 356/478 |
| 2008/0165900 A1* | 7/2008 | Vassilieva | ...................... | 375/329 |

FOREIGN PATENT DOCUMENTS

| | | |
|---|---|---|
| JP | 2006-191410 | 7/2006 |
| JP | 2007-129386 | 5/2007 |

OTHER PUBLICATIONS

T. Tomaru and M. Ban, "Secure Optical Communication Using Antisqueezing", Phys. Rev. A 74, 032312 (Sep. 2006).

* cited by examiner

*Primary Examiner* — Dzung Tran  
(74) *Attorney, Agent, or Firm* — Antonelli, Terry, Stout & Kraus, LLP.

(57) ABSTRACT

Signals can be superimposed on optical phase even when low-coherency light is used, and a bit rate and a signal coding format similar to those used in ordinary optical communications can be used. A transmitter includes an asymmetric interferometer or an antisqueezed light generator to convert a train of single pulses into a train of dual pulses. A receiver also includes an asymmetric interferometer that provides the same delay time as that between the dual pulses. The receiver allows pulses originating in the same light source to interfere, so that signals can be superimposed on the phase even when a low-coherency light source is used. The delay time (optical path length difference) provided in the asymmetric interferometer is set to be longer than half the period of the pulses outputted from the optical pulse source. In the transmitter, two pulses are modulated as a unit, one of the two pulses being the rear pulse of a pair of dual pulses and the other pulse being the front pulse of the next pair of dual pulses. In the receiver, a balanced detector receives the modulated pulses, and the balanced detector only outputs interference pulses but does not output non-interference pulses.

10 Claims, 5 Drawing Sheets

OPTICAL TRANSMITTING AND RECEIVING SYSTEM

CLAIM OF PRIORITY

The present application claims priority from Japanese Application JP 2007-158949 filed on Jun. 15, 2007, the content of which is hereby incorporated by reference into this application.

BACKGROUND OF THE INVENTION

1. Field of the Invention

The present invention relates to an optical transmitting and receiving system, and more particularly to a signal superimposing method in optical communications. The optical transmitting and receiving system and the signal superimposing method are also effective in quantum communications.

2. Background Art

Secrecy requirement in communication has been and will be studied, but might never be fully satisfied. In the recent networking society, advances in cryptography have reasonably fulfilled such requirement. For example, the public key cryptosystem, which is widely used at present, is a software-based cryptograph based on the fact that it takes unrealistically long time to break a cryptogram even when a high-speed computer is used. On the other hand, quantum cryptography, which has been actively studied in recent years and uses a principle based on physical laws, may pave the way for a new hardware-supported cryptosystem.

Although different from quantum cryptography in terms of purpose, there is a hardware-oriented approach that attempts to make optical communications themselves secure. At present, optical fibers are generally used in communications as a transmission channel in intermediate and long-haul transmission and output light from a laser diode (LD) is used as signal light. The output light from an LD is well described by the state called a coherent state, and the magnitudes of fluctuations of two quadrature components are equal to each other, which are equal to the magnitude of vacuum fluctuations. The fluctuations of an electromagnetic field can be controlled, and the so-called squeezed state is obtained by reducing the magnitude of fluctuations of one of the quadrature components and increasing that of the other. In the study described in T. Tomaru and M. Ban, Phys. Rev. A 74, 032312 (2006), signals are masked by increased fluctuations (antisqueezed component) for secure communication. The term "squeezed state" refers to the state in which the magnitude of the reduced (squeezed) fluctuations is smaller than that of the vacuum fluctuations. In a method using antisqueezing, it does not much matter whether or not the magnitude of fluctuations of the squeezed component is smaller than that of the vacuum fluctuations. The magnitude of fluctuations of the squeezed component can be larger than that of the vacuum fluctuations as long as the magnitude of fluctuations of the antisqueezed component is sufficiently large. In general, light with the magnitude of one of fluctuation components being larger than that of the other in a phase space is called antisqueezed light. That is, squeezed light is one type of antisqueezed light (T. Tomaru and M. Ban, Phys. Rev. A 74, 032312 (2006)). Antisqueezed light can be produced, for example, using the Kerr effect of an optical fiber (JP Patent Publication (Kokai) No. 2006-191410).

SUMMARY OF THE INVENTION

In optical communications using antisqueezed light, signals are superimposed on optical phase. In a method in which signals are superimposed on the phase, it is necessary to provide means for receiving the signals, for example, by allowing them to interfere with local light (phase shift keying: PSK) or by allowing successive bits to interfere with each other (differential phase shift keying: DPSK). Antisqueezing is, however, a process of increasing noise, and the coherence of signal light is reduced. Therefore, it is generally difficult to perform PSK or DPSK using antisqueezed light. Signals superimposed on the phase can, however, be detectable even when low-coherency light is used, if the light is split into two and one of them is used as local light. Therefore, by providing means for splitting an optical pulse from a light source into two with a delay in a transmitter and an asymmetric interferometer giving the equal delay in a receiver, optical pulses originating in the same light source interfere with each other in the receiver, allowing communications in which signals are superimposed on the phase (M. Hanna, H. Porte, J.-P. Goedgebuer, and W. T. Rhodes, Electron. Lett. 37, 644 (2001)). In this method, however, non-interference pulses appear before and after the interference pulse, so that only one-third the received optical pulses carry the signal. Therefore, the signal processing speed cannot be increased, and signal processing becomes complex.

An object of the present invention is therefore to increase the signal processing speed and simplify signal processing to be as simple as that in ordinary optical communications even in a method in which two optical pulses originating in the same light source are transmitted for interference.

In general, it is easier to achieve an increase in speed in an optical domain than to increase the speed of an electric circuit. Although use of an asymmetric interferometer increases the total number of optical pulses, the present invention provides means for maintaining the clock of an electric circuit.

A train of output pulses are converted into a train of dual pulses using an asymmetric interferometer or using an antisqueezed light generator in a transmitter. The delay time between the dual pulses is set to be longer than half the period of output pulses from an optical pulse source. Then, the rear pulse of the dual pulses becomes closer to the pulse that is one period behind than to the front pulse that is the pair to the rear pulse. A phase modulator in the transmitter modulates such pulses closer to each other as a unit. That is, although the number of pulses is doubled, the rate of the operation of the modulator is not set to be doubled. An asymmetric interferometer is provided in a receiver and set in such a way that the delay time provided by the arm length difference of the asymmetric interferometer is equal to the delay time between the dual pulses, allowing the dual pulses to interfere. Although there are non-interference pulses before and after an interference pulse as in related art, the output signal associated with the non-interference pulses becomes zero through balanced detection. The electric circuit in the receiver is driven in synchronization with the period of the interference pulses, and the non-interference pulses are ignored in terms of processing in the electric circuit. This will not become a problem because the output from the balanced detector is zero for non-interference pulses.

Although the asymmetric interferometers in the transmitter and the receiver triple the number of pulses, the electric circuits in the transmitter and the receiver may be driven at the rate of the pulses outputted from the optical pulse source, because the non-interference pulses, which have no information, will not be outputted from the balanced detector. DPSK or DQPSK (differential quaternary phase shift keying) coding can therefore be performed at the bit rate used in ordinary optical communications.

According to the present invention, high-speed, simple processing is achieved in a method in which signals are superimposed on optical phase even when low-coherency light, such as antisqueezed light, is used. The present invention thus allows not only optical communications based on quantum mechanics, but also, not limited thereto, optical communications using phase modulation even when low-coherency light is used.

DETAILED DESCRIPTION OF THE PREFERRED EMBODIMENTS

Embodiments of the present invention will be described below.

First Embodiment

Figure 1:
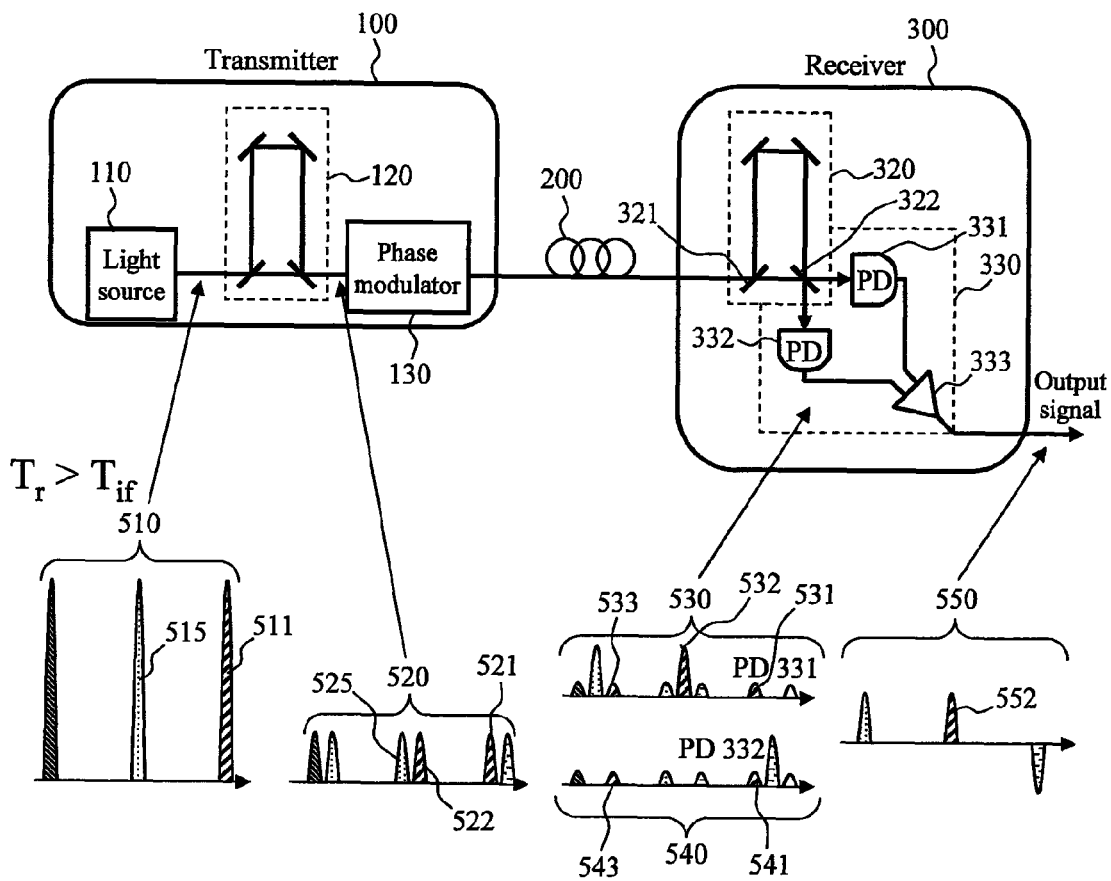
FIG. 1 is a block diagram showing an example of the optical transmitting and receiving system according to the present invention, and also shows the principle of the operation thereof.

FIG. 1 is a block diagram showing an example of the optical transmitting and receiving system according to the present invention. The upper part of FIG. 1 is a system configuration diagram, and the lower part of FIG. 1 is a schematic waveform diagram showing how a train of pulses propagate. A train of optical pulses 510 outputted from a light source 110 are inputted to an asymmetric interferometer 120, where each of the pulses is split into two. The train of optical pulses 510 is thus converted into a train of dual pulses 520. For example, a pulse 511 is split into pulses 521 and 522. The distance between dual pulses (the distance between the pulses 521 and 522, for example) produced in the asymmetric interferometer 120 is longer than half the distance between pulses outputted from the light source 110 (the distance between the pulses 521 and 525, for example). As a result, the rear pulse of the dual pulses is closer to the pulse that is one period behind than to the front pulse that is the pair to the rear pulse. For example, the pulse 522 is closer to the pulse 525 that is one period behind than to the pulse 521 that is the pair to the pulse 522. A phase modulator 130 modulates such pulses closer to each other as a unit. For example, pulses 522 and 525 are regarded as a unit. That is, the number of pulses is doubled because a single pulse has been converted into dual pulses, while the operating rate at the modulator is the same as the period of the original pulses. Signals are superimposed in a format of the differential phase between dual pulses, for example, the differential phase between the pulses 521 and 522. That is, a coding format is DPSK for binary signals of zero and one, and DQPSK for quaternary signals. In this embodiment, the intended coding format is DPSK.

Upon the modulation, the train of dual pulses, which form signal light, pass through a transmission channel 200 into a receiver 300. In the receiver 300, the train of dual pulses is inputted to an asymmetric interferometer 320 that provides the same optical path length difference as that provided in the asymmetric interferometer 120 in the transmitter 100. Two asymmetric interferometers 120 and 320 are set to be equal to each other not only in the optical path length differences but also in phase for interference, so that a pulse passing through the shorter arm of the asymmetric interferometer 120 and the longer arm of the asymmetric interferometer 320 and a pulse passing through the longer arm of the asymmetric interferometer 120 and the shorter arm of the asymmetric interferometer 320 have gone through the same optical path length and interfere with each other. The resultant pulse is detected only by either photodetector 331 or 332 according to the superimposed signal. A pulse that has passed through either the shorter or longer arms in both the asymmetric interferometers 120 and 320 does not interfere with anything at a 50:50 beam splitter 322 in the asymmetric interferometer 320, is simply split by the beam splitter 322 into two, and is detected by both the photodetectors 331 and 332.

For example, each of the optical pulses 521 and 522 is split into two by a 50:50 beam splitter 321, which then interfere with each other at the beam splitter 322. The resultant interference pulse 532 is detected by the photodetector 331. There are non-interference pulses 531 and 533 before and after the interference pulse. The non-interference pulses also appear on the photodetector 332 as non-interference pulses 541 and 543. The photodetectors 331 and 332 convert the interference pulse and the non-interference pulses into electric signals. An electric circuit 333 performs subtraction between electric signals from 331 and those from 332. Since a non-interference pulse is detected by both the photodetectors 331 and 332, the non-interference pulse results in an output signal with a value of zero after the subtraction. On the other hand, since pulses that interfere at the beam splitter 322 are detected only by either the photodetector 331 or 332, a positive or negative pulse is obtained after the subtraction. As a result, a train of positive and negative pulses are outputted, for example, as indicated by a sequence of output signals 550.

Although the number of pulses inputted to the photodetectors 331 and 332 is three times that of the pulses outputted from the light source 110, the bit rate of the final output pulses returns to that of the pulses outputted from the light source 110. Although unnecessary optical pulses are also inputted to the photodetectors 331 and 332, the photodetectors and other electric circuits do not need to follow such unnecessary optical pulses or operate accordingly, and need to operate only at the bit rate of interference pulses. That is, it appears that high-speed processing is required because of the increased number of optical pulses, but the actual processing rate required may be the bit rate of the pulses outputted from the light source 110 in the usual manner.

The output pulses from the low-coherence light source 110 hardly interfere with each other because of the low coherency. For example, the pulses 511 and 515, that is, the pulses 522 and 525 hardly interfere with each other. Therefore, for example, the pulses 521 and 522 need to be sufficiently separated from each other, while the separation between the pulses 522 and 525 may not be sufficiently large.

The above embodiment has been described with reference to the case where the delay time $T_{if}$ generated in each of the asymmetric interferometers 120 and 320 is smaller than the period $T_r$ of the output pulses from the light source 110. Conversely, $T_{if}$ may be greater than $T_r$ in the present invention. An example of such a situation is shown in a train of pulses in the lowest part of FIG. 1. For example, the order of the pulses 522 and 525 is reversed, resulting in the order of pulses 622 and 625 shown in the figure. In both cases, the bit rate of the signal is determined by the repetitive rate $f_r$ of the output pulses from the light source 110. A train of pulses 650 in the output signal are the same as a train of pulses 550 for the same $f_r$.

Second Embodiment

Consider the case where antisqueezed light (including squeezed light) is used as the low-coherence light. Antisqueezed light can be produced, for example, by using the Kerr effect of an optical fiber (JP Patent Publication (Kokai) No. 2006-191410). In the method using an optical fiber, when pump light enters the optical fiber, antisqueezed light and used pump light are obtained as the output. In the first embodiment, the asymmetric interferometer provided in the transmitter converts a single pulse into dual pulses. One of dual pulses may be antisqueezed light and the other one of the dual pulses may be used pump light. In the present invention, one of the dual pulses serves as reference light in the receiver, and the used pump light is suitable for reference light because the phase fluctuation of the used pump light is smaller than that of antisqueezed light.

Figure 2:
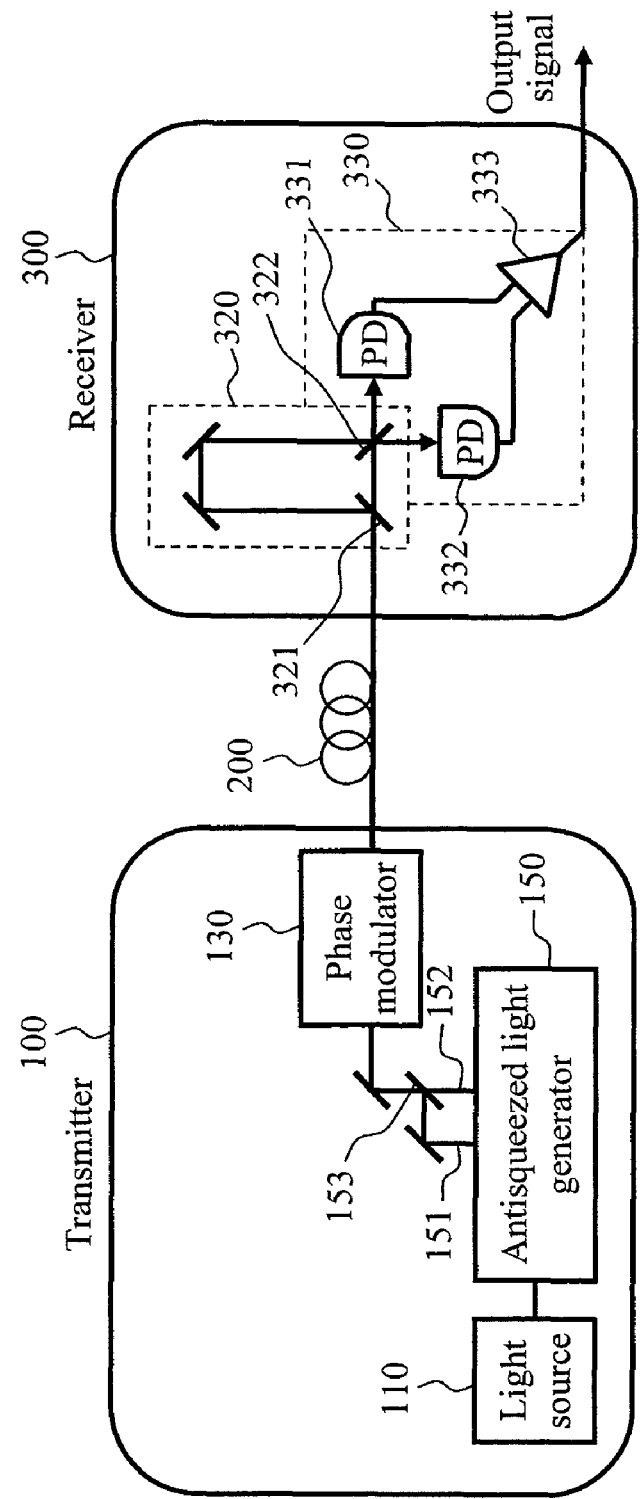
FIG. 2 is a block diagram of the optical transmitting and receiving system according to an embodiment in which dual pulses are formed of antisqueezed light and used pump light.

FIG. 2 is a block diagram of the optical transmitting and receiving system according to this embodiment in which dual pulses are formed of antisqueezed light and used pump light. The output light from a pump light source 110 is inputted to an antisqueezed light generator 150, and antisqueezed light and used pump light are outputted to optical paths 151 and 152, respectively, which are then combined into dual pulses at a beam splitter 153. The optical path length difference between the optical paths 151 and 152 is set to be equal to the optical path length difference in the asymmetric interferometer 320 in the receiver. In this embodiment, the antisqueezed light generator 150 and the beam splitter 153 form the asymmetric interferometer 120 in the transmitter in the first embodiment.

In general, in an antisqueezed light generator, the output intensity of the used pump light is greater than that of the antisqueezed light. In consideration of this fact, the reflectance of the beam splitter 153 is not set to 50%. For example, when the intensity ratio of the antisqueezed light to the used pump light is 1:99, the reflectance of the beam splitter 153 is set to 99%, and hence resultant dual pulses have the same intensity.

Figure 3:
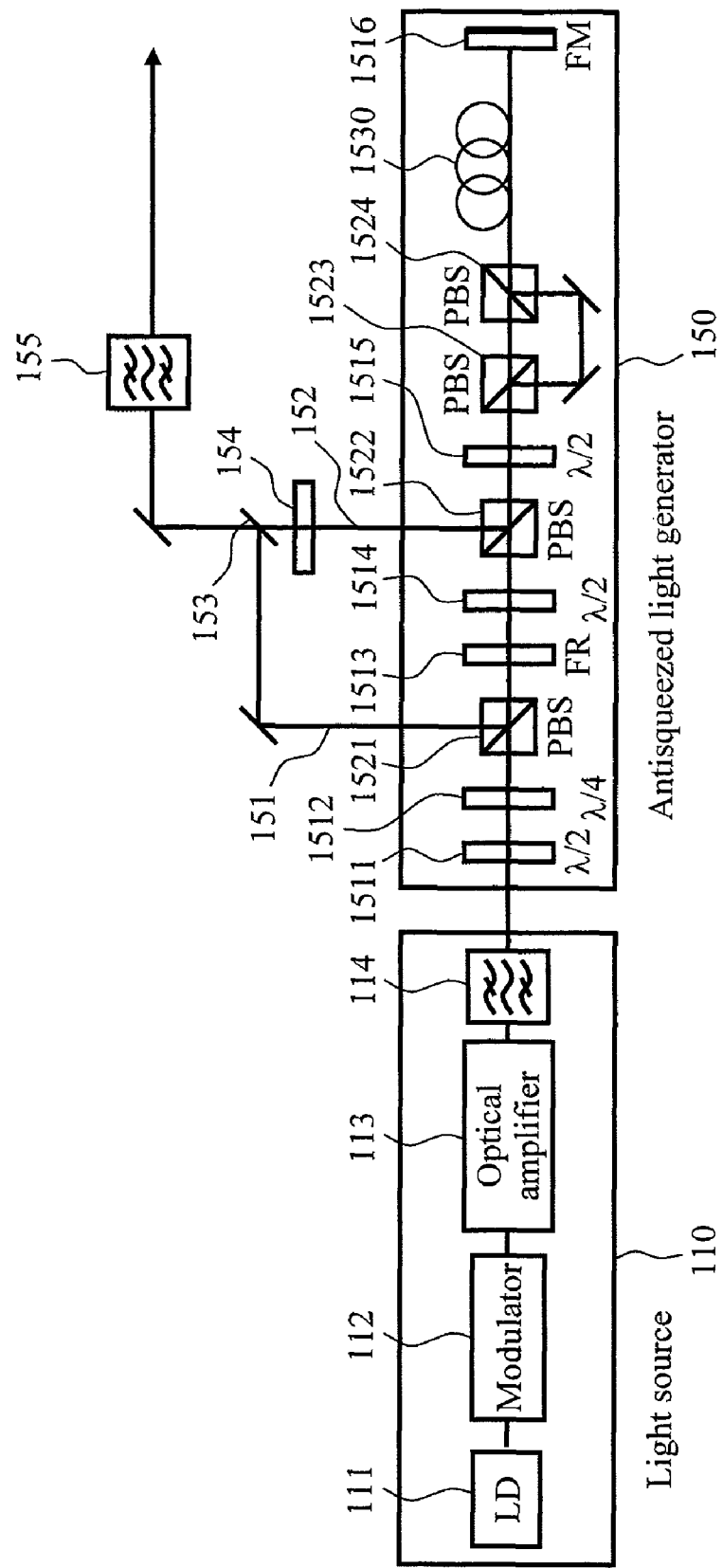
FIG. 3 shows an exemplary specific configuration of a light source and an antisqueezed light generator.

FIG. 3 shows a specific configuration of the light source 110 and the antisqueezed light generator 150. The output light of a laser diode (LD) 111 is converted into pulses by an intensity modulator 112, and the pulses are amplified by an optical amplifier 113 to produce optical pulses of high peak power. A band-pass filter 114 removes ASE (amplified spontaneous emission) generated in the optical amplifier from each of the amplified pulses. When a directly modulated LD is used, the modulator 112 is not required. In this case, the band-pass filter 114 removes not only ASE but also unnecessary spectral components in the directly modulated LD light. Further, by sufficiently increasing the degree of modulation in the direct modulation, coherence between pulses can be completely removed. Another alternative is using a phase modulator instead of an intensity modulator 112 in the case of continuous-wave LD. In this case, an optical fiber or the like is used to perform chirp compensation so that the phase-modulated light is converted into pulses.

The optical pulses of high peak power are inputted to the antisqueezed light generator 150. The optical pulses inputted to the antisqueezed light generator 150 pass through a $\lambda/2$ waveplate 1511 and a $\lambda/4$ waveplate 1512, where the optical pulses are linearly polarized (p-polarized). Then, the linearly polarized optical pulses pass through a polarizing beam splitter (PBS) 1521. When the optical components ranging from the LD 111 to the polarizing beam splitter 1521 are connected using polarization-maintaining fibers, the $\lambda/2$ waveplate 1511 and the $\lambda/4$ waveplate 1512 are not required. The polarization of the optical pulses that have passed through the polarizing beam splitter 1521 is rotated by a Faraday rotator 1513 by 45 degrees. The optical pulses then pass through a $\lambda/2$ waveplate 1514 to be p-polarized. The p-polarized optical pulses then pass through a polarizing beam splitter 1522. The optical pulses that have passed through the polarizing beam splitter 1522 pass through a $\lambda/2$ waveplate 1515, where the polarization of the optical pulses is rotated by 45 degrees. Each of the optical pulses is then split by a polarizing beam splitter 1523 into two. The two split beams are combined at a polarizing beam splitter 1524. Due to the optical path length difference, dual pulses, the polarization planes of which are perpendicular to each other, are obtained. The dual pulses propagate through an optical fiber 1530, where the dual pulses are antisqueezed due to the Kerr effect. Then, a Faraday mirror 1516 rotates the polarization of the antisqueezed dual pulses by 90 degrees. The dual pulses are then reflected off the mirror and travel through the optical fiber 1530 in the opposite direction. The Faraday mirror reverses the polarization planes of the dual pulses, so that the polarization planes of the dual pulses are swapped between in the left-to-right optical path and in the right-to-left optical path. Therefore, each pulse of the dual pulses follow the same optical path in the total of two ways, and return to the polarizing beam splitter 1523, where the dual pulses are combined into the original single pulse. The polarization of the resultant pulse is, however, rotated by 90 degrees with respect to the polarization of the original pulse. As a result, the pulse that has traveled in the opposite direction is reflected off the polarizing beam splitter 1522 and outputted into an optical path 152. This output is the used pump light.

When the optical fiber 1530 presents no Kerr effect and the optical system works in an ideal manner, the light that has traveled in the opposite direction is totally reflected off the polarizing beam splitter 1522, and transmitted light is vacuum. However, the Kerr effect of the optical fiber 1530 and interference between the dual pulses at the polarizing beam splitter 1523 produce a component that passes through the polarizing beam splitter 1522. This is an antisqueezed (squeezed) vacuum, that is, antisqueezed light. The antisqueezed light has a small amount of amplitude due to incompleteness of the optical system. The antisqueezed light that has passed through the polarizing beam splitter 1522 is reflected off the polarizing beam splitter 1521 and outputted into an optical path 151. The routes from the polarizing beam splitter 1522 to the beam splitter 153 correspond to the asymmetric interferometer 120 in the first embodiment.

As described in the foregoing paragraph, the antisqueezed light and the pump light have, in general, different output intensities. In consideration of this fact, the reflectance of the beam splitter 153 is set accordingly. To balance the intensities, it is effective to dispose an ND filter (optical attenuator) 154. Since antisqueezing is achieved by using a nonlinear effect, the spectrum of antisqueezed light is typically broader than that of the input light. To remove the unnecessary spectral components, it is effective to add a band-pass filter 155.

Third Embodiment

Figure 4:
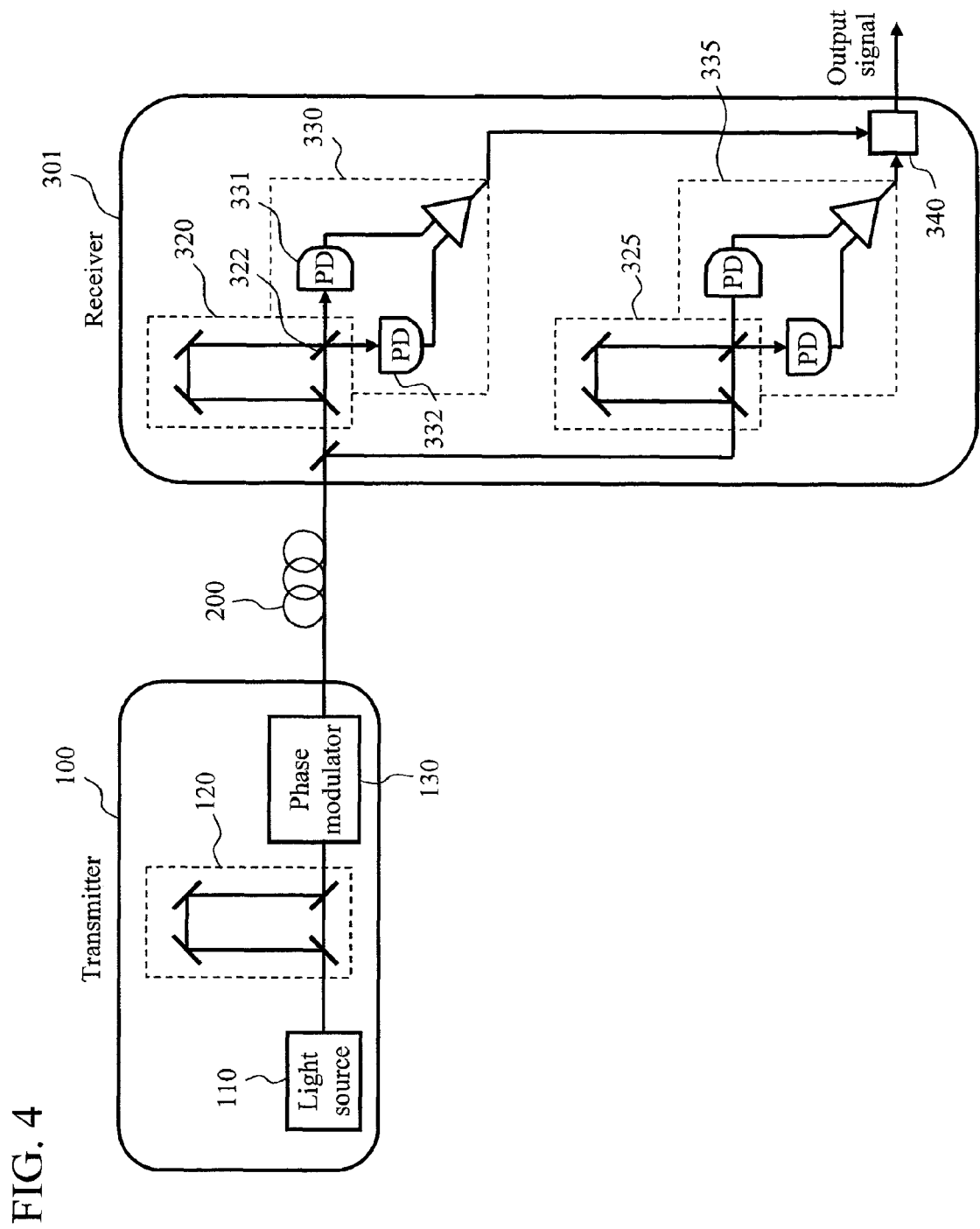
FIG. 4 is a configuration diagram showing a principle for performing DQPSK and multi-valued communications.

The configuration of the receiver 300 shown in FIG. 1 is used in the case where signals are superimposed in the DPSK coding format, and includes a set of the asymmetric interferometer 320 and the balanced detector 330. When signals are superimposed in the DQPSK coding format, another set of asymmetric interferometer and balanced detector are required. An example of such a configuration is shown in FIG. 4. Asymmetric interferometers 320 and 325 are set with 90-degree different phase so that the balanced detectors 330 and 335 detect quadrature components different from each other. The outputs, which are the quadrature components different from each other, are combined in a signal synthesizer circuit 340 to get a final output signal. Two sets of asymmetric interferometer and balanced detector allow not only DQPSK-based signal coding but also multi-valued signal coding in which the number of multiple values is greater than that in DQPSK.

Similarly, in the embodiment shown in FIG. 2 in which antisqueezed light is used, provision of another set of asymmetric interferometer and balanced detector allows DQPSK-based signal coding and multi-valued signal coding in which the number of multiple values is greater than that in DQPSK.

Fourth Embodiment

Figure 5:
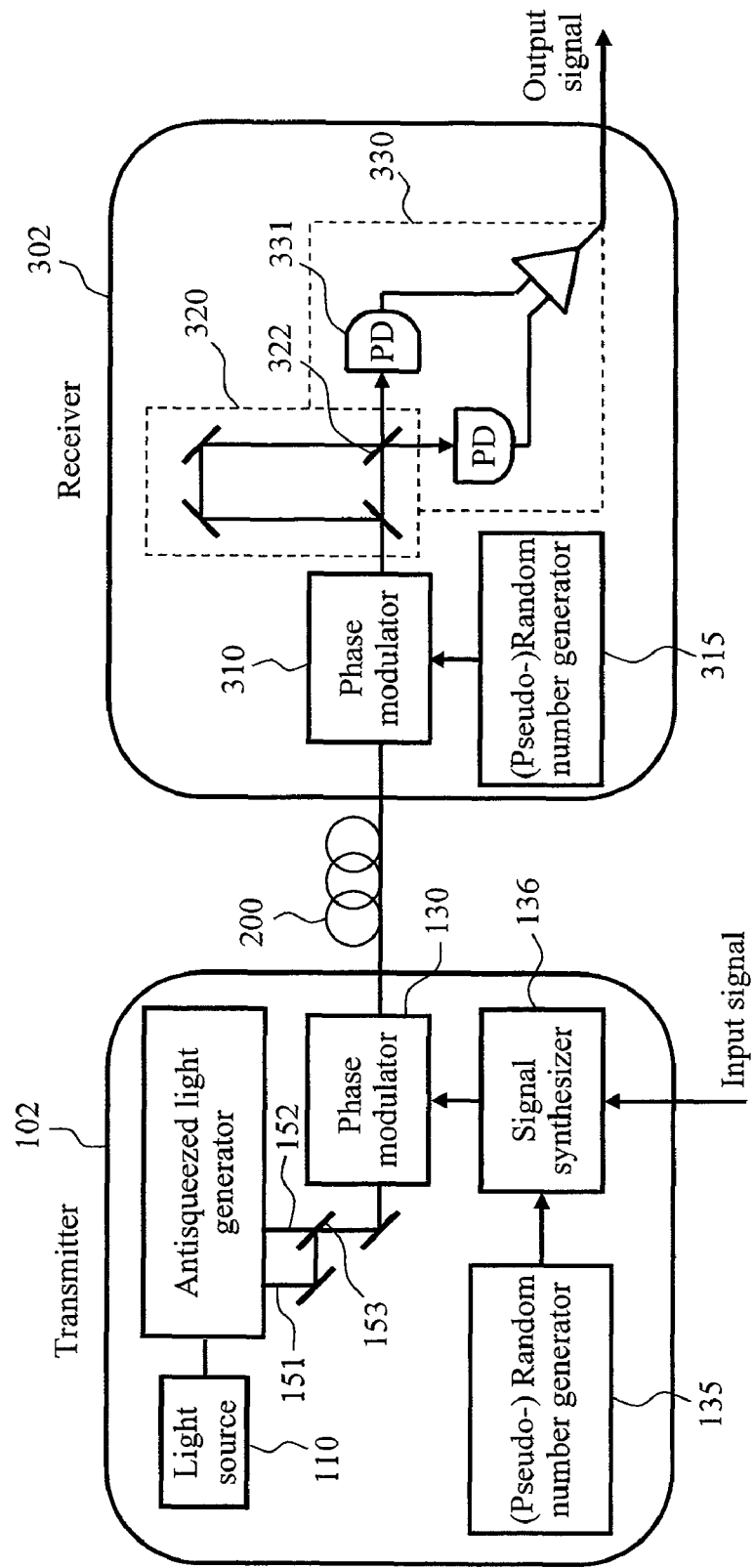
FIG. 5 is a configuration diagram showing a principle for performing secure optical communications.

In one form of optical communications using antisqueezed light, not only are signals modulated, but also signal bases are modulated using random numbers or pseudo-random numbers in the transmitter. Such a scheme makes eavesdropping difficult to achieve. To cancel the random numbers-based or pseudo-random numbers-based modulation added in the transmitter, the receiver also includes a phase modulator 310. A specific example of such a configuration is shown in FIG. 5.

The transmitter 102 includes a (pseudo-) random number generator 135 and a signal synthesizer 136 that combines input signals with (pseudo-) random numbers. The receiver 302 also includes a (pseudo-) random number generator 315. When pseudo-random numbers are used, and the transmitter and the receiver use the same seed key and the same algorithm, the additive modulation on the signal basis is cancelled, so that the signal processing after signal receiving is the same as that in ordinary optical communications. Even when random numbers are used, the same processing procedure as in the case of pseudo-random numbers can be used when the receiver shares in advance the same random numbers as those used in the transmitter. When random numbers are used in the transmitter, but the random numbers are not shared by the receiver in advance, it is necessary to perform post processing to judge that communication is successful or not. The communication is successful only when the value of a random number in the transmitter coincides with the value of a random number in the receiver.

The system of this embodiment is similar to the system in FIG. 2 except that the phase modulator 310, the (pseudo-) random number generators 135 and 315, and the signal synthesizer 136 are added thereto. The similar configuration is applicable to the system in FIG. 1.

Each of the asymmetric interferometers 120, 320, and 325 in the above embodiments may be any type of asymmetric interferometer as long as it converts a train of optical pulses into a train of dual pulses, such as a Mach Zehnder or Michelson interferometer. Further, the components of the interferometer may be of free-space type or waveguide type using, for example, a PLC (Planar Lightwave Circuit).

According to the present invention, even when low-coherency light, such as antisqueezed light, is used, a signal can be superimposed on the phase, for example, in the DPSK-based coding format. Antisqueezed light is a key element that allows communication with increased safety from the viewpoint of physical laws even for macroscopic light intensity. The present invention provides a technology for using a light source essential to achieve a secure communication method under realistic conditions, so that such a technology can be used in many applications. Further, the present invention provides an effective technology that is not limited to be used with antisqueezed light, but also used with low-coherence light, so that such a technology can be used in many applications.

DESCRIPTION OF SYMBOLS 100 transmitter
102 transmitter
110 light source
111 laser diode
112 intensity modulator
113 optical amplifier
114 band-pass filter
120 asymmetric interferometer
130 phase modulator
135 (pseudo-) random number generator
136 signal synthesizer
150 antisqueezed light generator
151 optical path
152 optical path
153 beam splitter
154 ND filter
155 band-pass filter
200 optical transmission channel
300 receiver
301 receiver
302 receiver
310 phase modulator
315 (pseudo-) random number generator
320 asymmetric interferometer
321 50:50 beam splitter
322 50:50 beam splitter
325 asymmetric interferometer
330 balanced detector
331 photodetector
332 photodetector
333 differential output circuit
335 balanced detector
340 output signal synthesizing circuit
510 a train of pulses just after outputted from optical pulse source
511 optical pulse
515 optical pulse
520 a train of dual pulses produced by asymmetric interferometer
521 front pulse of dual pulses originating from 511
522 rear pulse of dual pulses originating from 511
525 front pulse of dual pulses originating from 515
530 a train of triplet optical pulses that arrives at photodetector 331
531 one of equally split front pulses originating from 521
532 pulse resulting from interference between one of equally split rear pulses originating from 521 and one of equally split front pulses originating from 522
533 one of equally split rear pulses originating from 522
540 a train of triplet optical pulses that arrives at photodetector 332
541 one of equally split front pulses originating from 521
543 one of equally split rear pulses originating from 522
550 a train of electric pulses outputted from balanced detector
552 received pulse originating from 511
610 a train of pulses just after outputted from optical pulse source 611 optical pulse
615 optical pulse
620 a train of dual pulses produced by asymmetric interferometer
621 front pulse of dual pulses originating from 611
622 rear pulse of dual pulses originating from 611
625 front pulse of dual pulses originating from 615
630 a train of triplet optical pulses that arrives at photodetector 331
640 a train of triplet optical pulses that arrives at photodetector 332
650 a train of electric pulses outputted from balanced detector
1511 λ/2 waveplate
1512 λ/4 waveplate
1513 Faraday rotator
1514 λ/2 waveplate
1515 λ/2 waveplate
1516 Faraday mirror
1521 polarizing beam splitter
1522 polarizing beam splitter
1523 polarizing beam splitter
1524 polarizing beam splitter
1530 optical fiber

What is claimed is:

1. An optical transmitting and receiving system comprising:
    an optical transmitter;
    an optical receiver; and
    an optical transmission channel that connects the optical transmitter to the optical receiver,
    wherein the optical transmitter includes an optical pulse source, a first asymmetric interferometer that converts a train of output pulses from the optical pulse source into a train of dual pulses, the delay time of which is longer than half the period of the output pulses, a phase modulator that modulates two optical pulses as a unit, one of the two optical pulses having passed through one arm of the first asymmetric interferometer, the other optical pulse having passed through another arm of the first asymmetric interferometer, the original pulse giving the other optical pulse being different from the original pulse giving the one optical pulse, where an original pulse means a pulse in the train just outputted from the optical pulse source,
    the receiver includes a second asymmetric interferometer that provides the same optical path length difference as that provided in the first asymmetric interferometer, and a balanced detector, and
    signal light outputted from the optical transmitter and propagating through the optical transmission channel passes through the second asymmetric interferometer in the optical receiver and is received by the balanced detector.

2. The optical transmitting and receiving system according to claim 1,
    wherein the phase modulator modulates the optical pulses in a DPSK coding format.

3. The optical transmitting and receiving system according to claim 1,
    wherein the phase modulator modulates the optical pulses in a DQPSK coding format or a multi-valued coding format in which the number of multiple values is greater than that in DQPSK.

4. The optical transmitting and receiving system according to claim 1,
    wherein the balanced detector includes two photodetectors and produces an output signal by performing subtraction between the outputs of the two photodetectors.

5. The optical transmitting and receiving system according to claim 1,
    wherein the optical receiver includes a phase modulator located before of the second asymmetric interferometer,
    the phase modulator in the optical transmitter adds the phase determined by a random number or pseudo-random number to signal phase, and
    the phase modulator in the optical receiver modulates the signal light in such a way that the added phase is cancelled.

6. An optical transmitting and receiving system comprising:
    an optical transmitter;
    an optical receiver; and
    an optical transmission channel that connects the optical transmitter to the optical receiver,
    wherein the optical transmitter includes an optical pulse source, an antisqueezed light generator that generates antisqueezed light from a train of output pulses from the optical pulse source, means to form a train of dual pulses by combining a train of pulses of the antisqueezed light and the train of pulses that have been used to generate the antisqueezed light, where the delay time between the dual pulses is longer than half the period of the output pulses from the optical pulse source, a phase modulator that modulates a pulse of the antisqueezed light and one of the used pulses as a unit, the original pulse giving the used pulse being different from the original pulse giving the pulse of the antisqueezed light, where an original pulse means a pulse in the train just outputted from the optical pulse source,
    the optical receiver includes an asymmetric interferometer, the arm length difference of which provides the same delay time as that between the dual pulses, and a balanced detector, and
    signal light outputted from the optical transmitter and propagating through the optical transmission channel passes through the asymmetric interferometer in the optical receiver and is received by the balanced detector.

7. The optical transmitting and receiving system according to claim 6,
    wherein the phase modulator modulates the optical pulses in a DPSK coding format.

8. The optical transmitting and receiving system according to claim 6,
    wherein the phase modulator modulates the optical pulses in a DQPSK coding format or a multi-valued coding format in which the number of multiple values is greater than that in DQPSK.

9. The optical transmitting and receiving system according to claim 6,
    wherein the balanced detector includes two photodetectors and produces an output signal by performing subtraction between the outputs of the two photodetectors.

10. The optical transmitting and receiving system according to claim 6,
    wherein the optical receiver includes a phase modulator located before the asymmetric interferometer,
    the phase modulator in the optical transmitter adds the phase determined by a random number or pseudo-random number to signal phase, and
    the phase modulator in the optical receiver modulates the signal light in such a way that the added phase is cancelled.

* * * * *